(12) United States Patent
Sonalker et al.

(10) Patent No.: US 11,912,265 B2
(45) Date of Patent: Feb. 27, 2024

(54) METHODS AND SYSTEMS FOR PARKING A VEHICLE

(71) Applicant: STEER-Tech, LLC, Annapolis Junction, MD (US)

(72) Inventors: Anuja Sonalker, Ellicott City, MD (US); Bohan Wang, Columbia, MD (US); Jonathon Ridge, Annapolis Junction, MD (US)

( * ) Notice: Subject to any disclaimer, the term of this patent is extended or adjusted under 35 U.S.C. 154(b) by 0 days.

(21) Appl. No.: 18/108,403

(22) Filed: Feb. 10, 2023

(65) Prior Publication Data

US 2023/0192073 A1 Jun. 22, 2023

Related U.S. Application Data

(63) Continuation of application No. 17/518,793, filed on Nov. 4, 2021, now Pat. No. 11,597,383.

(51) Int. Cl.
*B60W 30/06* (2006.01)
*B60W 50/14* (2020.01)
*G06V 20/58* (2022.01)

(52) U.S. Cl.
CPC ............ *B60W 30/06* (2013.01); *B60W 50/14* (2013.01); *G06V 20/586* (2022.01); *B60W 2420/42* (2013.01); *B60W 2530/201* (2020.02)

(58) Field of Classification Search
CPC ...... G05D 1/0246; G05D 1/0231; B60R 1/00; B60R 2300/301; B60R 1/002; B60R 2300/102; B60R 2300/10; B60R 2300/00; B60R 2300/103; B60R 2300/105; B60R 2300/108; B60R 2300/101; B60R 2300/303; B60R 2300/80; B60R 2300/8066; B60R 2300/8093; B60R 2300/806; B60R 2300/808; B60W 2420/42; G01S 2013/93271; G01S 2013/93272; G08G 1/142; B60K 2370/21; B60Q 9/005

See application file for complete search history.

(56) References Cited

U.S. PATENT DOCUMENTS 9,308,913 B2 4/2016 Mukaiyama
9,987,983 B2 6/2018 Lewis et al.
10,214,240 B2 2/2019 Ghose et al.
(Continued)

OTHER PUBLICATIONS

Jianbing Ni, Xiaodong Lin, Xuemin Shen, Toward privacy-preserving valet parking in autonomous driving era, Jan. 23, 2019.

*Primary Examiner* — Kenneth J Malkowski
(74) *Attorney, Agent, or Firm* — Caldwell Intellectual Property Law

(57) ABSTRACT

Aspects relate to methods and systems for parking a vehicle. An exemplary system includes a first plurality of sensors located on the vehicle and configured to detect first sensor data as a function of objects over a first height range, a second plurality of sensors located on the vehicle and configured to detect second sensor data as a function of objects over a second height range at least partially greater than the first height range, and a computing device configured to receive the first sensor data from the first plurality of sensors and the second sensor data from the second plurality of sensors, and determine the space proximal the vehicle is suitable for parking the vehicle as a function of the first sensor data, the second sensor data, and a height of the vehicle.

20 Claims, 9 Drawing Sheets

(56) References Cited

U.S. PATENT DOCUMENTS

| | | |
|---|---|---|
| 10,328,932 B2 | 6/2019 | Gieseke et al. |
| 10,336,318 B2 | 7/2019 | Aich et al. |
| 10,384,719 B2 | 8/2019 | Kim |
| 10,453,340 B2 | 10/2019 | Fuehrer |
| 2013/0300872 A1* | 11/2013 | Park ................ B60R 1/00 348/148 |
| 2016/0358474 A1* | 12/2016 | Uppal ............... G06V 20/586 |
| 2018/0157267 A1* | 6/2018 | Gao ................ B62D 15/0295 |
| 2020/0025873 A1* | 1/2020 | Kubertschak ......... G01S 17/931 |
| 2020/0130677 A1 | 4/2020 | Zhang |
| 2020/0339196 A1* | 10/2020 | Jang ................ B60W 40/06 |
| 2020/0398823 A1 | 12/2020 | Oba |
| 2021/0224559 A1* | 7/2021 | Rider ................ G06F 18/22 |

\* cited by examiner

METHODS AND SYSTEMS FOR PARKING A VEHICLE

CROSS-REFERENCE TO RELATED APPLICATIONS

This application is a continuation of Non-provisional application Ser. No. 17/518,793 filed on Dec. 4, 2021 and entitled "METHODS AND SYSTEMS FOR PARKING A VEHICLE," the entirety of which is incorporated herein by reference.

FIELD OF THE INVENTION

The present invention generally relates to the field of autonomous vehicles. In particular, the present invention is directed to methods and system for parking a vehicle.

BACKGROUND

Presently many of the recreational vehicles (RVs) on the road are rented; and many rented RVs are driven by first time RV drivers. As a result small accidents and fender benders occur with RVs, especially as a result of the increased height of the RV. Because of the specialized nature of RV repair, fixing an RV after a small accident can take weeks or even months and result in the RV being unavailable for use for the rest of the vacation season.

SUMMARY OF THE DISCLOSURE

In an aspect, a system for parking a vehicle, the system including a recreational vehicle, wherein the recreational vehicle includes a living quarters. The system further including a first plurality of sensors located on the recreational vehicle and configured to detect first sensor data as a function of a first set of objects over a first height range and a second plurality of sensors located on the recreational vehicle and configured to detect second sensor data as a function of a second set of objects over a second height range, wherein the second height range is at least partially greater than the first height range and at least an object of the second set of objects is overhead and includes tree branches. The system further including a computing device including a processor and configured to receive the first sensor data from the first plurality of sensors and the second sensor data from the second plurality of sensors, determine a suitability of a room for the recreational vehicle to park, wherein the room for the recreational vehicle to park is a space proximal to the recreational vehicle, for parking the recreational vehicle as a function of the first sensor data, the second sensor data, and a height of the recreational vehicle, wherein the height of the recreational vehicle is within the second height range, and park, using an automatic valet system, the recreational vehicle in the room for the recreational vehicle to park as a function of the suitability of the room for the recreational vehicle to park.

In another aspect, a method of parking a vehicle, the method including detecting, using a first plurality of sensors located on a recreational vehicle, first sensor data as a function of a first set of objects over a first height range, wherein the recreational vehicle includes a living quarters. The method further including detecting, using a second plurality of sensors located on the recreational vehicle, second sensor data as a function of a second set of objects over a second height range, wherein the second height range is at least partially greater than the first height range and at least an object of the second set of objects is overhead. The method further including receiving, using a computing device, the first sensor data from the first plurality of sensors and the second sensor data from the second plurality of sensors. The method further including determining, using the computing device, a suitability of a room for the recreational vehicle to park, wherein the room for the recreational vehicle to park is a space proximal to the recreational vehicle, for parking the recreational vehicle as a function of the first sensor data, the second sensor data, and a height of the recreational vehicle, wherein the height of the recreational vehicle is within the second height range. The method further including parking, using an automatic valet system, the recreational vehicle in the room for the recreational vehicle to park as a function of the suitability of the room for the recreational vehicle to park.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for parking a vehicle. In an embodiment, vehicle includes an extraordinarily tall vehicle, such as a tractor trailer or a recreational vehicle and systems and methods relate to automated, semi-automated, and/or assisted parking of the vehicle with a consideration for tall obstructions.

Aspects of the present disclosure can be used to ensure that inexperienced RV drivers do not have an accident parking an RV, while on vacation. Aspects of the present disclosure can also be used to automatically park tractor trailers, for example within a shipping depot. This is so, at least in part, because systems and methods described in this disclosure include methods for detecting tall obstructions.

Aspects of the present disclosure allow for simultaneous mapping of while parking a vehicle. Mapping may allow future autonomous and/or semi-autonomous vehicles to make use of a map further limiting a likelihood of an accident at that location. Exemplary embodiments illustrating aspects of the present disclosure are described below in the context of several specific examples.

Figure 1:
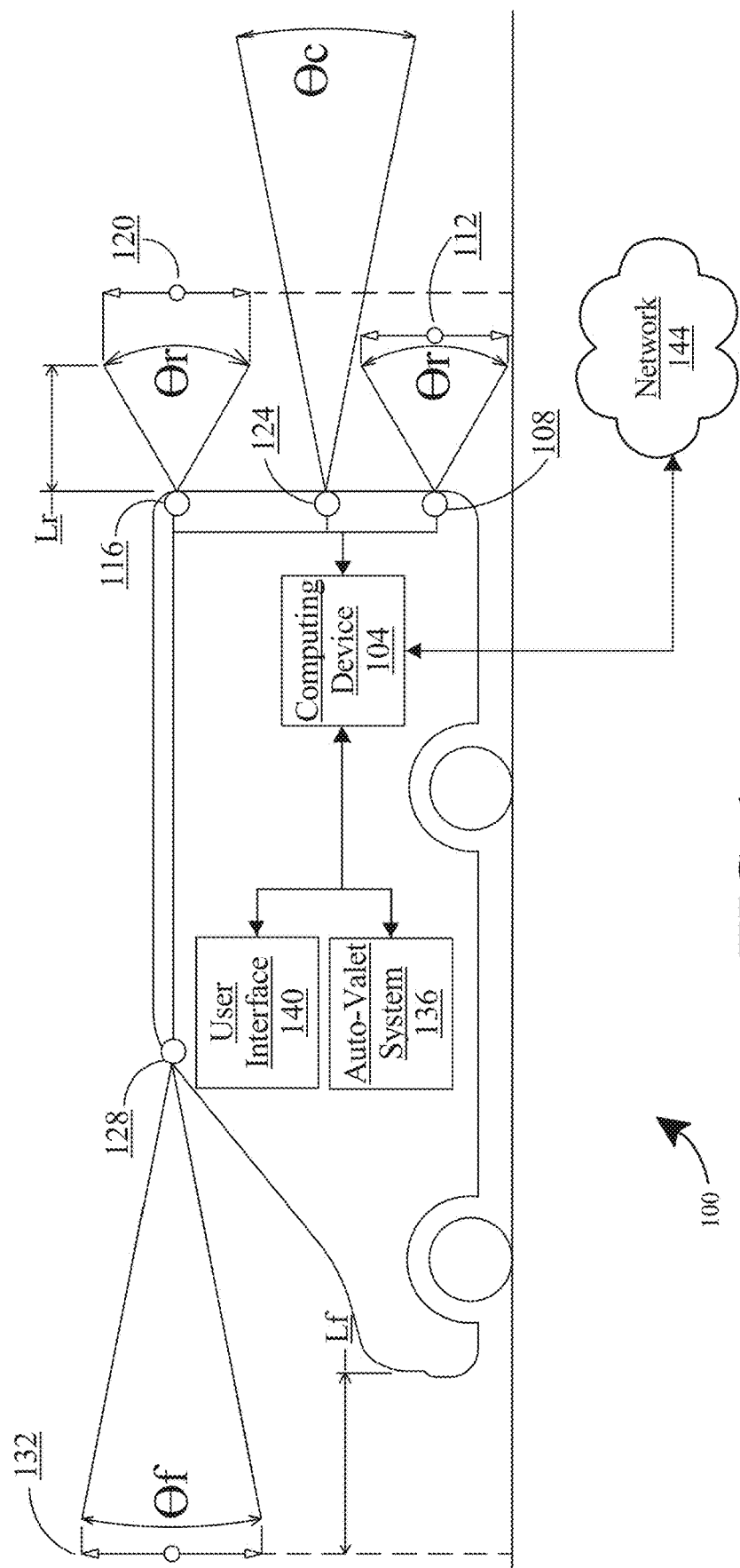
FIG. 1 is a side view schematic of an exemplary vehicle including an exemplary system for parking the vehicle.

Referring now to FIG. 1, an exemplary embodiment of a system 100 for parking a vehicle is illustrated. As used in this disclosure, a "vehicle" is a transportation device. In some cases, a vehicle may be used to transport materials, such as goods. Alternatively or additionally, a vehicle may be used to transport people. In some cases, a vehicle may be a land vehicle. Alternatively or additionally, a vehicle may be a boat or an aircraft. Vehicle may be parked when not in use. As used in this disclosure, "parked" when used as a noun refers to a state of vehicle when not in use. As used in this disclosure, an act of "parking" refers to moving of a vehicle to a specific location where it may be parked. A parked vehicle may be parked for short periods of time (e.g., seconds or minutes), for instance with an engine of the vehicle still running. Alternatively, vehicle may be parked for longer durations (e.g., minutes, hours, days, and the like), for instance with an engine within the vehicle turned off.

With continued reference to FIG. 1, in some embodiments, vehicle may include a recreational vehicle. As used in this disclosure, a "recreational vehicle (RV)" is a vehicle or trailer that includes living quarters, for instance sleeping berth, a head, a galley, and the like. In some cases, vehicle may include any relatively tall (e.g., taller than an ordinary car) vehicle. Exemplary tall vehicles include, without limitation buses, vans, tractors, tractor-trailer trucks, trucks (e.g., dump trucks, box trucks, etc.) and the like. In some embodiments, vehicle may include one or more blind spots. A "blind spot," for the purposes of this disclosure, is an area into which a driver of a vehicle is unable to see, either by direct line-of-sign, or through the use of mirror. Some vehicles may have front blind spots. A "front blind spot," for the purposes of this disclosure, is a blind spot of a vehicle created from the obstruction of the driver's view by a hood of the vehicle. Some vehicles may have rear blind sports. A "rear blind spot," for the purposes of this disclosure, is a blind sport of a vehicle created from the obstruction of the driver's view by a side or rear portion of the vehicle. In some embodiments, recreational vehicle may have a larger front blind spot than a standard vehicle. This may be because the driver is located further from the ground compared to their position in a normal vehicle. In some cases, the hood of recreational vehicle may protrude outward farther than in a normal vehicle, thereby increasing the size of the front blind spot. In some embodiments, recreational vehicle may have a larger rear blind sport than a standard vehicle. This may be because recreational vehicle may lack a rear window. This may also be because recreational vehicle has a greater width compared to a standard vehicle. This may also be because recreational vehicle has a larger vehicle length compared to a standard vehicle. In some embodiments, vehicle may include a plurality of mirrors. For example, vehicle may include a rear view mirror and/or a set of side view mirrors. In some embodiments, a recreational vehicle may lack a rear-view mirror. In some embodiments, recreational vehicle may have side view mirrors that are larger than those of a standard vehicle. In some embodiments, side view mirrors of recreational vehicle may each include multiple mirror segments, wherein each mirror segment may include different mirror types. Mirror types may include, as non-limiting examples, concave, convex, flat, and the like. In some embodiments, recreational vehicle may be configured to be driven offroad. "Offroad," means not on a road marked for use with standard vehicles. For example, offroad may include use on a trail, path, field, and the like, whereas it does not include use on a highway, byway, paved road, or gravel road intended for use with standard cars.

With continued reference to FIG. 1, system 100 includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 for parking a vehicle may include a first plurality of sensors 108. As used in this disclosure, a "sensor" is a device that is configured to detect a phenomenon. In some cases, a sensor may be configured to detect a phenomenon and generate data representative of the phenomenon. In some cases, data generated by a sensor may be represented by way of a signal. In some cases, first plurality of sensors 108 may be located at a rear of vehicle. As used in this disclosure, a "rear" of a vehicle is a portion of the vehicle which is normally facing away from a direction of travel when the vehicle is moving. In some cases, first plurality of sensors 108 may be configured to detect first sensor data as a function of objects over a first height range 112. For example, first plurality of sensors 108 may be located or oriented in position and/or attitude to detect objects over a first height range 112. As used in this disclosure, "sensor data" is information that represents at least a phenomenon. In some cases, sensor data may be generated by at least a sensor. As used in this disclosure, a "height range" is a range of vertical distances, for example above the ground. In some embodiments, a first plurality of sensors 108 may have a working distance Lr. Working distance may be distance away from a sensor that the sensor may still detect an object. One or more sensors belonging to first plurality of sensors 108 may additionally have a field of view Or, within which objects may be detected. In some cases, a detectable region may be at least partially defined by working distance and field of view. In some cases, first height range 112 may be a function of location and alignment of first plurality of sensors 108 and field of view Or and working distance Lr or distance an object is away from the first plurality of sensors 108. In some cases, first plurality of sensors 108 may be located and aligned in such a manner that detectable region lies proximal the ground and therefore detects objects that are substantially near or on the ground, such as without limitation curbs, pillars, rocks, children's toys, and the like.

With continued reference to FIG. 1, system 100 may include a second plurality of sensors 116. In some cases, second plurality of sensors 116 may be located at a rear of vehicle. Second plurality of sensors 116 may be configured to detect second sensor data as a function of objects over a second height range 120. For example, first plurality of sensors 108 may be located or oriented in position and/or attitude to detect objects over a first height range 112. In some cases, second height range 120 may be at least partially greater than first height range 112. In some embodiments, a second plurality of sensors 116 may have a working distance Lr. Working distance may be distance away from a sensor that the sensor may still detect an object. One or more sensors belonging to second plurality of sensors 116 may additionally have a field of view Or, within which objects may be detected. In some cases, a detectable region may be at least partially defined by working distance and field of view. In some cases, second height range 120 may be a function of location and alignment of second plurality of sensors 116 and field of view Or and working distance Lr or distance an object is away from the second plurality of sensors 116. In some cases, second plurality of sensors 116 may be located and aligned in such a manner that detectable region lies includes a height approximately that of vehicle and therefore detects objects that are substantially near or below roofline of vehicle, such as without tree branches, garage door entrances, roof eaves, and the like. In some embodiments, second plurality of sensors 116 and/or first plurality of sensors 108 may be configured to detect objects within a rear blind spot of the vehicle. Objects in the rear blind spot of the vehicle may include trees, rocks, logs, ledges and other obstacles commonly encountered offroad. Objects in rear blind spot may include objects such as people, other vehicles, bikers, walls, and the like. Detecting objects within a rear blind spot may include objects within 2 meters of the rear of the vehicle. In some embodiments, first plurality of sensors 108 may be configured to detect objects in a rear blind spot of a vehicle. In some embodiments, second plurality of sensors and/or camera 124 may be configured to detect objects in a rear blind spot of the vehicle; for example, this may be useful when the vehicle is a recreational vehicle. This may be due to the lack of a rear view window in a recreational vehicle—thus, a rear blind spot of a recreational vehicle may extend higher in altitude than a rear blind sport of a conventional vehicle.

Still referring to FIG. 1, in some embodiments, at least a sensor may include a proximity sensor. As used in this disclosure, a "proximity sensor" is a device that is configured to detect a relative location of an object, for instance in relation to the proximity sensor. A proximity sensor may emit an electromagnetic field or a beam of electromagnetic radiation, for example without limitation infrared or ultrasonic radiation. Proximity sensor may detect a change in electromagnetic field or return signal. In some cases, an object being detected may be referred to as proximity sensor's target. In some cases, different proximity sensor targets demand different sensors. For example, a capacitive proximity sensor or photoelectric sensor might be suitable for a plastic target; an inductive proximity sensor always requires a metal target. Exemplary non-limiting proximity sensors include capacitive sensors, capacitive displacement sensors, Doppler effect sensors, magnetic sensors, optical sensors, such as without limitation photoelectric sensors, photocell sensors, laser rangefinders, passive optical sensors, and the like, radar sensors, reflection of ionizing radiation sensors, sonar sensors, ultrasonic sensors, fiber optics sensors, Hall effect sensors, and the like. In some embodiments, system 100 may include or otherwise be communicative with a locating sensor. As used in this disclosure, a "locating sensor" may be any sensor or plurality of sensors that can be used to detect information useful for determining a location of the sensor. Non-limiting examples of locating sensors include a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like.

With continued reference to FIG. 1, in some cases, computing device 104 is in communication with first plurality of sensors 108 and/or second plurality of sensors 116. Computing device 104 may be configured to receive first sensor data from first plurality of sensors 108 and second sensor data from second plurality of sensors 120. For example, in some cases one or both of first sensor data and second sensor data may be communicated by way of at least a signal, for instance a communication signal. As used in this disclosure, a "signal" is intelligible any representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized according, for example by way of an analog to digital converter. In some cases, an analog signal may be process, for example by way of any analog signal processing steps described in this disclosure, prior to digitization. In some cases, a digital signal may be used to communicate between two or more devices, such as without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, system 100, for example a sensor or computing device 104, may perform one or more signal processing steps on communication signal, such as without limitation a signal representing sensor data and/or image data. For instance, system 100 may analyze, modify, and/or synthesize a signal representative of sensor data and/or image data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, computing device 104 may be configured to determine a space proximal vehicle is suitable for parking. For instance, computing device 104 may determine that a space proximal vehicle is suitable for parking the vehicle as a function of one or both of first sensor data and second sensor data. As used in this disclosure, "space" proximal a vehicle is a volume of physical space located substantially proximal the vehicle. As used in this disclosure, "suitable for parking" is an attributive, for example of a given space, that a vehicle is able to be parked. In some cases, a space is determined suitable for parking based upon a size of the space relative a vehicle. In some cases, computing device 104 may determine that a space proximal a vehicle is suitable for parking the vehicle as a function of a height of the vehicle. As used in this disclosure, a "height of a vehicle" is a vertical distance of the vehicle. In the case of a large wheeled-vehicle, such as an RV or truck, a height of the vehicle may include a distance from a bottom of tires (or ground) to highest most part of the vehicle (e.g., roof, cowling, smoke stake, top of a CB radio antenna, and the like). In some cases, height of a vehicle may be within a second height range over which second plurality of sensors 116 may be configured to detect.

Still referring to FIG. 1, in some embodiments, system 100 may additionally include at least a camera 124. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, a camera may be sensitive within a non-visible range of electromagnetic radiation, such as without limitation infrared. In some cases, at least a camera 124 may be located at a rear of vehicle. At least a camera 124 may be configured to sense image data as a function of a space proximal vehicle. In some cases, at least a camera 124 may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

Still referring to FIG. 1, in some embodiments, system 100 may include a machine vision system that includes at least a camera 124. A machine vision system may use images from at least a camera 124, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, at least a camera 124 may include a range-imaging camera. An exemplary range-imaging camera that may be included in at least a camera 124 is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provide a field of view (FOV) of 85.2° (horizontal) by 58° (vertical) and an image resolution of 1280×720. Range-sensing camera may be operated independently by dedicated hardware, or, in some cases, range-sensing camera may be operated by a computing device. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries. In some cases, at least a camera 124 may include a machine vision camera. An exemplary machine vision camera that may be included in at least a camera 124 is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording. In some cases, computing device 104 may be in communication with at least a camera 124. Computing device 104 may be additionally configured to receive image data from at least a camera 124. In some embodiments computing device 104 may be configured to determine space proximal vehicle is suitable for parking the vehicle as a function of image data. In some embodiments, at least a camera 124 may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, California. TaraXL is a USB 3.0 stereo-camera which is optimized for NVIDIA® Jetson AGX Xavier™/ Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

With continued reference to FIG. 1, computing device 104 may determine suitability for parking as a function of one or more of sensor data, image data, and height of vehicle. For example, in some cases, sensor data and/or image data may be used to analyze a space proximal vehicle for room to park, for instance in all three dimensions. Room to park may include room large enough for vehicle in additional to some buffer space, for example for opening doors and the like. In some cases, room to park may be at least partially determined by one or more of length of vehicle, height of vehicle, and/or width of vehicle. Any method described in this disclosure may be used to help determine suitability for parking, including without limitation machine-learning processes and machine vision processes. For example, in some cases, a machine-learning process may be used to train a machine-learning algorithm including training data. Training data for example may include sensor data and/or image data as inputs correlated to a representation of room to park as an output. In some cases, a representation of room to park may include without limitation discrete classifications, such as without limitation a binary determination YES there is room to park or NO there is not room to park. Alternatively and/or additionally, in some cases, a representation of room to park may include a spatial representation, such as without limitation a geometric model (e.g., 3D model), of the room to park. In some cases, a spatial representation may be compared with one or more known dimensions of vehicle (e.g., height of vehicle). Training data may include input data and output data from historical parking situations. Training data may include input and output data from modeled and/or artificial parking situations. In some cases, training data may use data from one or more vehicles during use. For example, training data may be updated as system is used. In some cases, training data may include substantially only input data, for example sensor data and/or image data, and at least an unsupervised machine-learning process may be utilized. Alternatively or additionally, in some cases, training data may include inputs and outputs and at least a supervised machine-learning process may be utilized. In some cases, machine vision processes, such as without limitation object recognition, may be used to estimate space for parking and if any objects are present without the space that may make the space unsuitable for parking. In some cases, any sensor, for example from first, second, or third plurality of sensors, may be used at any point to determine if space is suitable or unsuitable for parking. For example, in some embodiments, vehicle may have begun to park within a space when a sensor may detect an object with the space (or between vehicle and space), resulting sensor data may be used by computing device 104 determine that space is unsuitable for parking, even after parking has commenced. Likewise, in some embodiments, system 100 may be used for other transportation types besides parking. Notably, third plurality of sensors 128, in some embodiments, may be used to determine if vehicle's present course may interfere with an object, such as a low hanging drive through restaurant roof eave or overpass.

Still referring to FIG. 1, in some embodiments, system 100 may include a third plurality of sensors 128 located at a front of vehicle. As used in this disclosure, a "front" of a vehicle is a portion of the vehicle which is normally facing toward a direction of travel when the vehicle is moving. In some cases, third plurality of sensors 128 may be configured to detect objects over a third height range 132. In some cases, third height range 132 may at least partially overlap with second height range 120. Third plurality of sensors 128 may be configured to detect objects substantially in front of a vehicle, such that a vehicle traveling forward (i.e., not in reverse) may be at risk of colliding with the objects. Third plurality of sensors may be configured to detect objects within the front blind spot of the vehicle. In some embodiments, detecting objects within the front blind spot of the vehicle may include detecting objects within 2 meters of the front of the vehicle. In some cases, third plurality of sensors 128 may be configured to detect objects while a vehicle is moving, driving, or parking. For example, third plurality of sensors 128 may have a longer range and thereby allow for detection of objects farther away from vehicle 100. In some cases, detection of objects at greater distances increases time between detection and collision and, therefore, allows vehicle to operate at greater speeds (i.e., not only parking speeds). In some cases, third plurality of sensors 128 may have a detection range that is a function of vehicle speed (e.g., highway speed 55 M.P.H., 65 M.P.H., 80 M.P.H. and the like), vehicle deceleration (i.e., braking force/rate), and/ or sensor detection time. In some cases, third plurality of sensors 128 may be configured to detect one or more of overpass or bridge (for example, on Storrow Drive in Boston, Mass.), awning, roof, garage door, and the like.

Still referring to FIG. 1, in some embodiments, system 100 may additionally include an automatic valet system 136. As used in this disclosure, an "automatic valet system" is a system that is configured to automatically park a vehicle, for instance with little or no intervention from a driver. An automatic valet system may include one or more computing devices to perform processing, one or more sensors to detect a world around vehicle, as well as a vehicle interface that allows the automatic valet system 136 to control vehicle subsystems, such as without limitation steering, drivetrain components (e.g., transmission, trans-axle, and the like), engines and/or motors, and brakes. In some cases, automatic valet system 136 may be configured to automatically park vehicle in a space, for example as a function of suitability of the space for parking the vehicle. Additional disclosure related to an automatic valet system may be found in U.S. Non-provisional application Ser. No. 16/242,102 filed on Jan. 8, 2019, and entitled "AUTOMATED VALET SYSTEM," the entirety of which is incorporated herein by reference and U.S. Provisional Patent Application Ser. No. 62/614,847, filed on Jan. 8, 2018, and titled "AUTOMATED VALET SYSTEM," which is incorporated by reference herein in its entirety.

Still referring to FIG. 1, in some embodiments, system 100 may additionally include a user interface 140. As used in this device, a "user interface" is any system or subsystem that is configured to interact with a user, for instance without limitation a driver or operator of vehicle. In some cases, user interface 140 may be configured to alert a driver of the vehicle as a function of the determination of suitability. Exemplary non-limiting user interfaces include displays, loudspeakers, lights, touchscreens, buttons, keyboards, mice, joysticks, and the like. In some cases, user interface may include a loudspeaker and alert may include an audible alert, such as an alarm. In some cases, user interface may include a display and alert may include a visual alert, such as a written warning. In some cases, user interface may include a light and alert may include a flashing light.

Still referring to FIG. 1, in some embodiments, system 100 may be communicative, for example with one or more remote computing devices, by way of at least a network 144. At least a network 144 may include any network described in this disclosure, including without limitation a wireless network (Wi-Fi), a local area network (LAN), a wide area network (WAN), a controller area network (CAN), the Internet, and the like. In some cases, computing device 104 may be configured to communicate map data over at least a network 144. As used in this location, "map data" is information that represents at least a physical space in a manner that is intelligible to either a person or a machine. In some embodiments, map data may be substantially geometric. Alternatively or additionally, map data be substantially graphical. In some cases, map data may be configured for display to a user, for example by way of at least a display. Map data may include any survey data and/or designators associated with a at least a physical space. In some cases map data may include a parking map. In some cases, computing device 104 may be configured to generate map data as a function of sensor data. In some cases, computing device 104 may be configured to survey space to generate map data. As used in this disclosure, "surveying" is an act of measuring and recording with a certain level of precision a geographic location, area, or point. In some embodiments, aspects of the present invention may allow non-expert users to survey a point of interest and/or geographic locations associated with a space with a certain level of precision, without need for extensive training. In some cases, computing device 104 may be configured to survey a parking geofence for parking location. As used in this disclosure, a "parking geofence" is at least an element of data that represents a positional boundary of a parking location to a certain level of precision. In some embodiments, parking geofence may include coordinates (e.g., geofence and/or waypoints) associated with a space and/or at least a parking spot within parking location. In some embodiments, parking geofence may include coordinates associated with a "default" parking spot. In some cases, default parking spot coordinates may be used for parking map administration purposes, including without limitation disambiguation, or resolving conflicts or occupancy conflicts in edge cases. Computing device 104 may be configured to record a parking waypath for parking path. As used in this disclosure, "recording" is an act of measuring and recording with a certain level of precision a geographic location, area, or path along which an autonomous vehicle is intended to be driven. In some embodiments, aspects of the present invention may allow non-expert users to record a path and/or geographic locations associated with a path with a certain level of precision, without need for extensive training. As used in this disclosure, a "parking waypath" is at least an element of data that represents a parking path. In some cases, a parking waypath may include one or more waypoints representative of locations along the parking path.

With continued reference to FIG. 1, computing device 104 may be configured to generate map data, such as without limitation a parking map for a space, for example as a function of sensor data and/or image data. As used in this disclosure, a "parking map" may include a map associated with a space. Parking map may include one or more elements of survey data. As used in this disclosure, "survey data" is data measured and/or recorded by a computing device 104 during or for the purpose of surveying. For example, survey data may be measured and/or recorded by any sensor and/or camera described in this disclosure. Survey data may be collected from image data for example by way of one or more machine-vision processes. For example, in some cases, survey data may be collected from image data by way of feature recognition and/or pose estimation (e.g., homography transformation). Survey data may be recorded from one or more locating sensors, such as without limitation GPS sensors. According to some embodiments, parking map may include more than one of any survey designators or survey data. In some embodiments, computing device 104 may communicate parking map to at least an autonomous vehicle. Computing device 104 may be communicative with at least an autonomous vehicle by way of one or more networks 144, for example any network described in this disclosure. In some embodiments, computing device 104 may be configured to receive site-specific driving rules associated with a space. In some cases, parking map may be generated to include site-specific driving rules. As used in this disclosure, "site-specific driving rules" are local rules which govern an autonomous vehicle only at a specific point of interest and/or space; site-specific driving rules are in contrast to global driving rules which govern an autonomous vehicle at substantially all points of interest. In some cases, a user may input site-specific driving rules into computing device 104 directly or by way of another computing device in communication with the computing device. Alternatively and/or additionally, a remote device may communicate site-specific driving rules to computing device 104. In some cases, a user may input site-specific driving rules into remote device.

Still referring to FIG. 1, in some embodiments, computing device 104 may be configured to package a survey data structure. As used in this disclosure, a "survey data structure" is aggregated data that includes a plurality of datatypes resulting from surveying a point of interest. In some cases, computing device 104 may be configured to upload survey data structure to another remote device for map generation. In some embodiments, computing device 104 may generate parking map using survey data structure. In some embodiments, computing device 104 and system 100 may be further configured to survey at least a signage waypoint. As used in this disclosure, a "signage waypoint" is at least an element of data representative of a geographical location, area, or point of a road sign. In some embodiments, computing device 104 may be further configured to designate at least a signage designator to at least a signage waypoint. As used in this disclosure, a "signage descriptor" is at least an element of data representative of a specific road sign located at a specific location. In some embodiments computing device 104 may be configured to receive a surveyor identifier and/or a task identifier. As used in this disclosure, a "surveyor identifier" is at least an element of data that uniquely identifies a system 100 used for surveying and/or a user of the system 100. As used in this disclosure, a "task identifier" is at least an element of data that uniquely identifies a specific surveying process. In some cases, computing device 104 may validate, surveyor identifier and/or task identifier, for example before accepting survey data.

Figure 2:
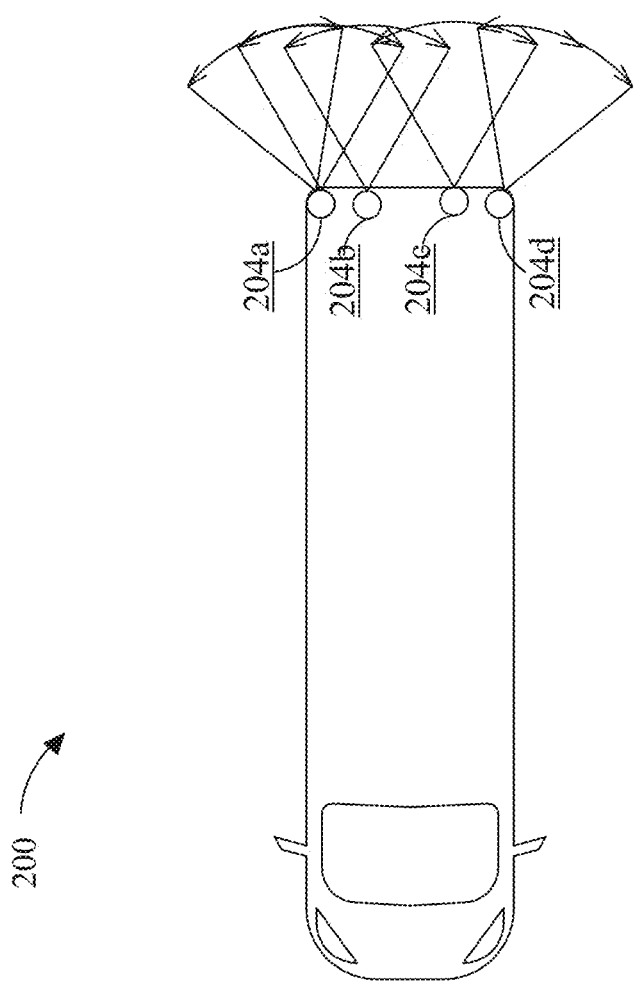
FIG. 2 is a top view schematic of an exemplary vehicle including an exemplary system for parking the vehicle having a first plurality of sensors.

Referring now to FIG. 2, an exemplary system 200 for parking a vehicle is illustrated from a top-down view to show first plurality of sensors 204a-d. First plurality of sensors 204a-d may include any sensors described in this disclosure. First plurality of sensors may be configured to detect an object substantially within a first height range. For example, first plurality of sensors 204a-d may be substantially located at a first height within vehicle, such as at approximately a bumper height of vehicle. In some cases, first plurality of sensors 204a-d may be configured to detect objects that are substantially near and/or on the ground, for example without limitation curbs, pillars, and the like.

Figure 3:
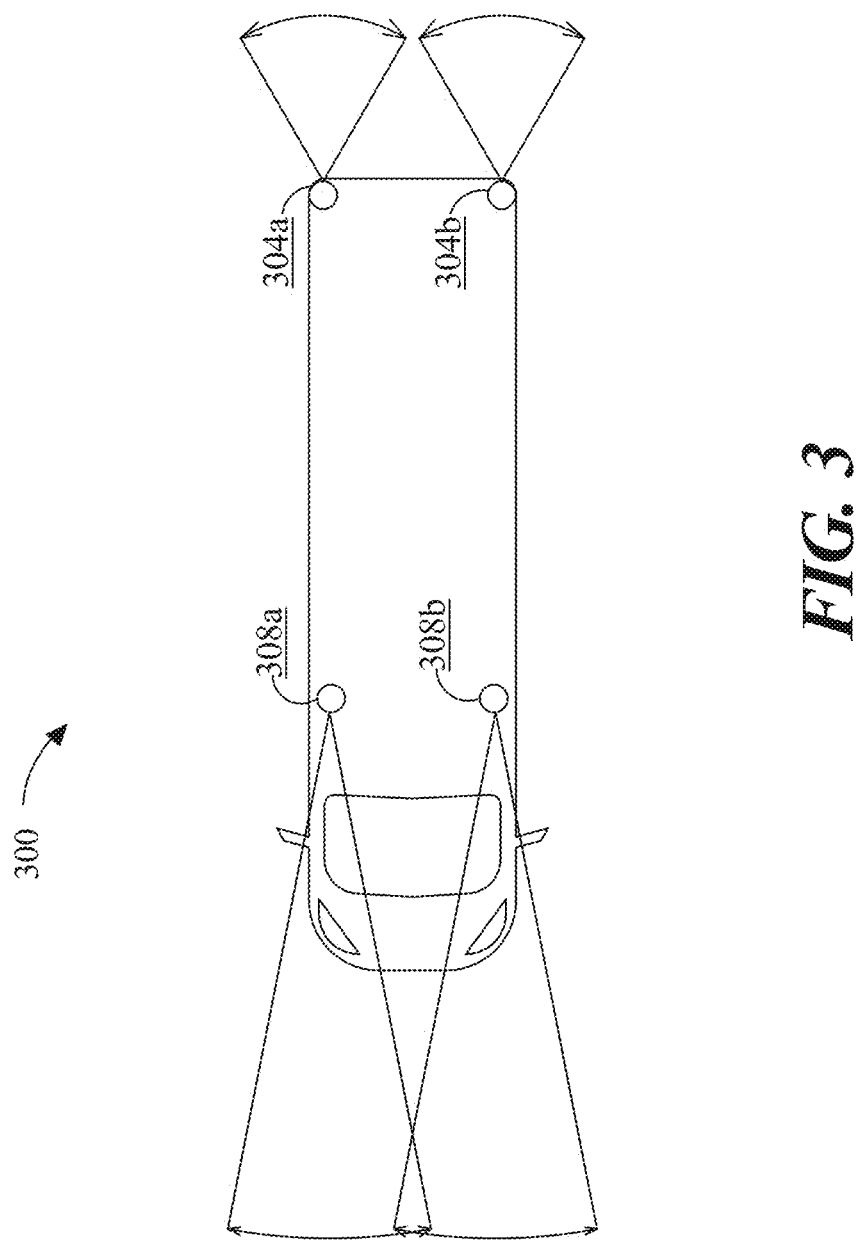
FIG. 3 is a top view schematic of an exemplary vehicle including an exemplary system for parking the vehicle having a second plurality of sensors and a third plurality of sensors.

Referring now to FIG. 3, an exemplary system 300 for parking a vehicle is illustrated from a top-down view to show second plurality of sensors 304a-b and third plurality of sensors 308a-b. Second plurality of sensors 304a-b may include any sensor described in this disclosure. Second plurality of sensors may be configured to detect an object substantially within a second height range. For example, second plurality of sensors 304a-b may be substantially located at a second height within vehicle, such as at approximately a roof height of vehicle. In some cases, second plurality of sensors 304a-b may be configured to detect objects that are substantially overhead and/or above the ground, for example without limitation tree branches, top of garage door openings, and the like.

With continued reference to FIG. 3, third plurality of sensors 308a-b may include any sensor described in this disclosure. Third plurality of sensors may be configured to detect an object substantially within a third height range. For example, third plurality of sensors 308a-b may be substantially located at a third height within vehicle, such as at approximately a roof height of vehicle. In some cases, third plurality of sensors 308a-b may be configured to detect objects that are substantially overhead and/or above the ground, for example without limitation tree branches, bottom of overpasses, and the like.

Figure 4:
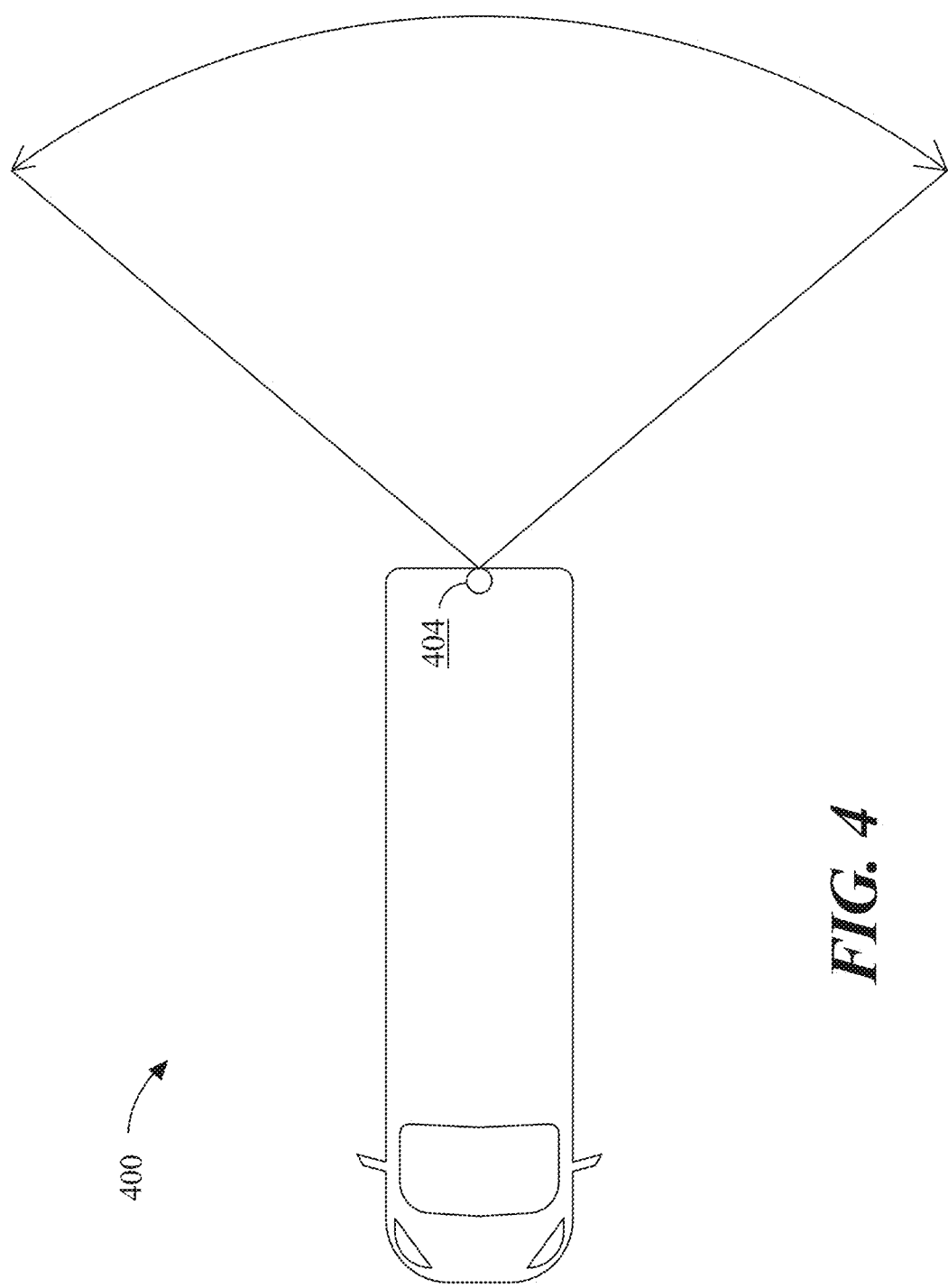
FIG. 4 is a top view schematic of an exemplary vehicle including an exemplary system for parking the vehicle having at least a camera.

Referring now to FIG. 4, an exemplary system 400 for parking a vehicle is illustrated from a top-down view to show at least a camera 404. At least a camera 404 may include any camera described in this disclosure. At least a camera 404 may be configured to image a space substantially proximal vehicle. In some cases, at least a camera 404 may be configured to image a space vertically extending from the ground up to a height above that of vehicle. In some cases, at least a camera 404 may be configured to image space horizontally at least as wide as vehicle. At least a camera 404 may be configured to image a space proximal vehicle with sufficient resolution and completeness, such that image data from the at least a camera 404 may be used to determine suitability of the space for parking the vehicle. Although sensors have been shown at front and rear of vehicle, sensors, include first, second, and/or third plurality of sensors may be located on any side of vehicle, including without limitation front, rear, side, top, and bottom. Likewise, exemplary embodiments have shown a large vehicle with two sets of plurality of sensors 108 and 116, configured for parking vehicle by way of backing-in. The present invention likewise includes similar configurations, which allow for forward parking of vehicle.

Figure 5:
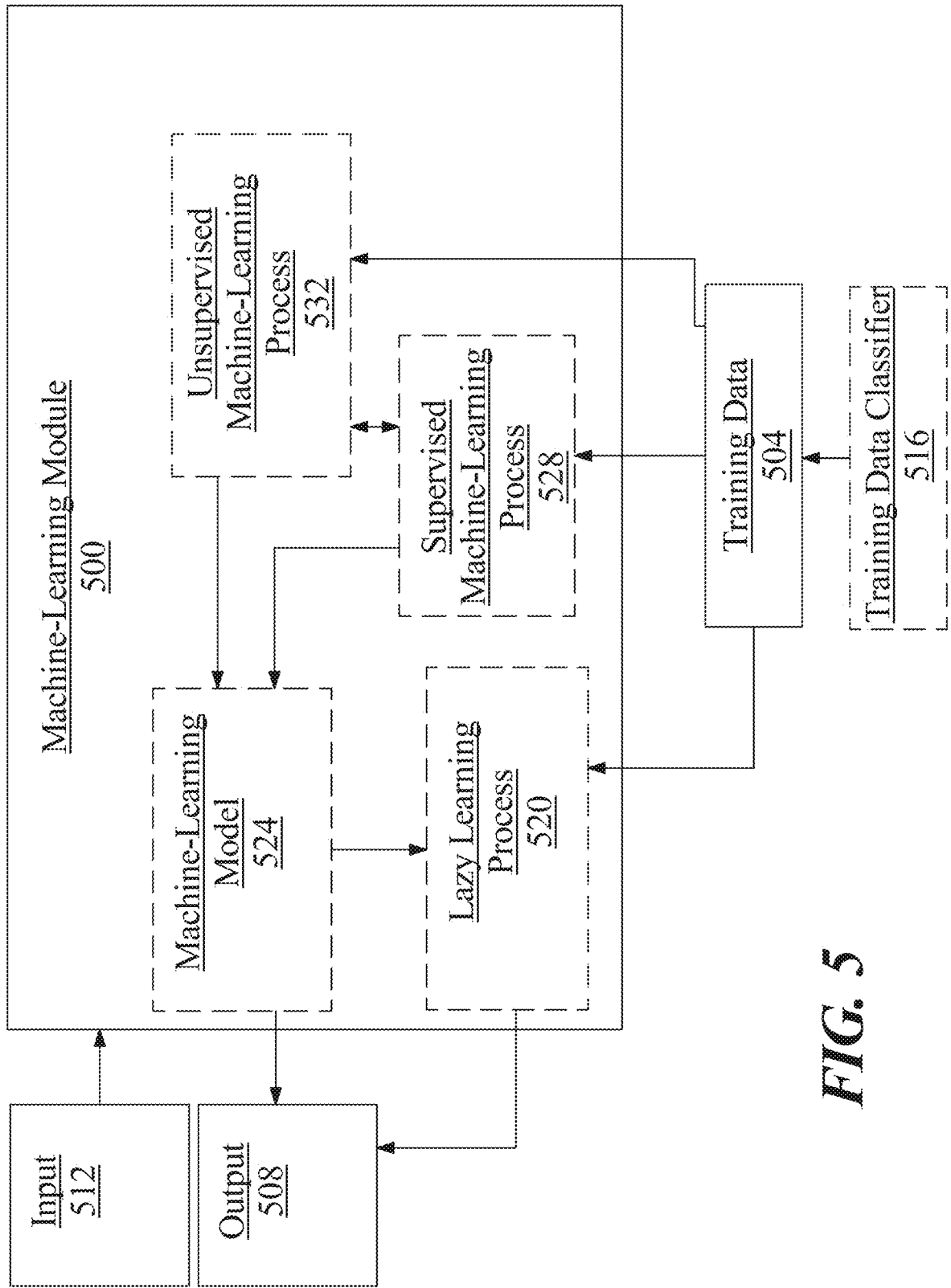
FIG. 5 is a block diagram illustrating exemplary machine learning processes.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below.

Training data 504 used by machine-learning module 500 may correlate any input data as described in this disclosure to any output data as described in this disclosure. As a non-limiting illustrative sensor data and/or camera data may be used as input data and a 3D estimate of space for parking may be used as output data.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data according to vehicle type, driver type, and the like. In some cases, a classifier may use training data that correlates input data including sensor data and/or camera data to a determination of suitability for parking.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include sensor data and/or camera data as described above as inputs, models of space for parking as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
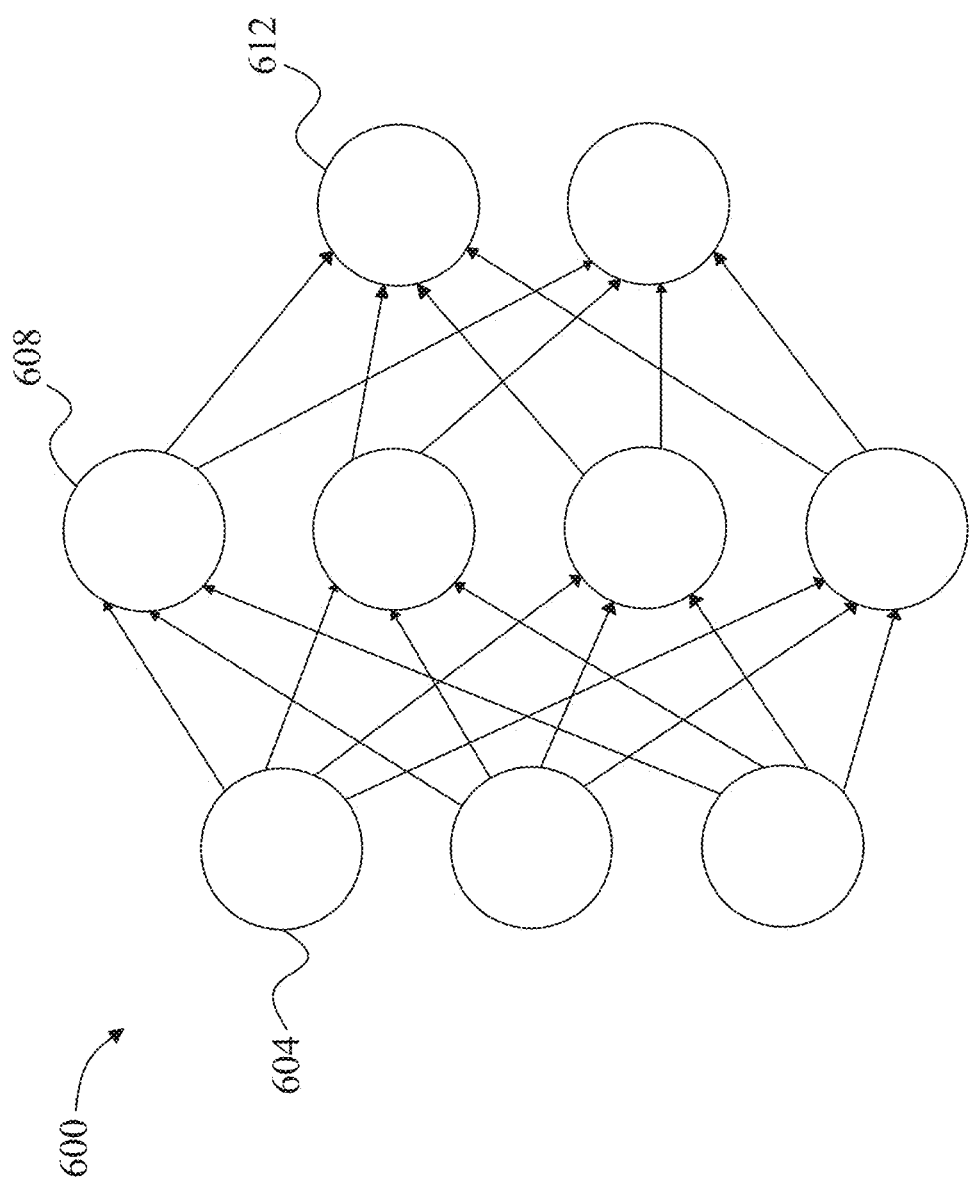
FIG. 6 illustrates an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 7:
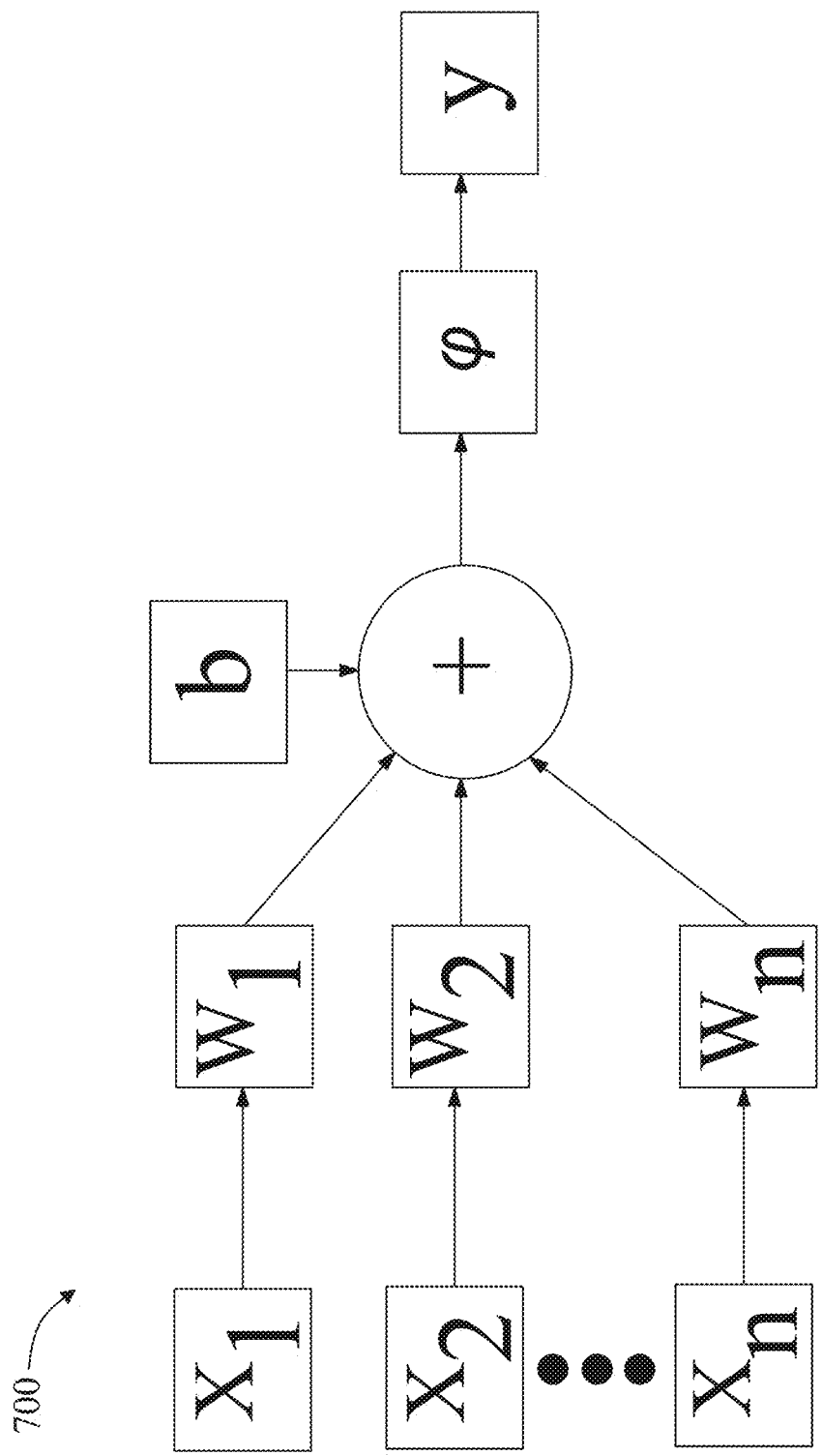
FIG. 7 illustrates an exemplary node of an exemplary neural network.

Referring now to FIG. 7, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
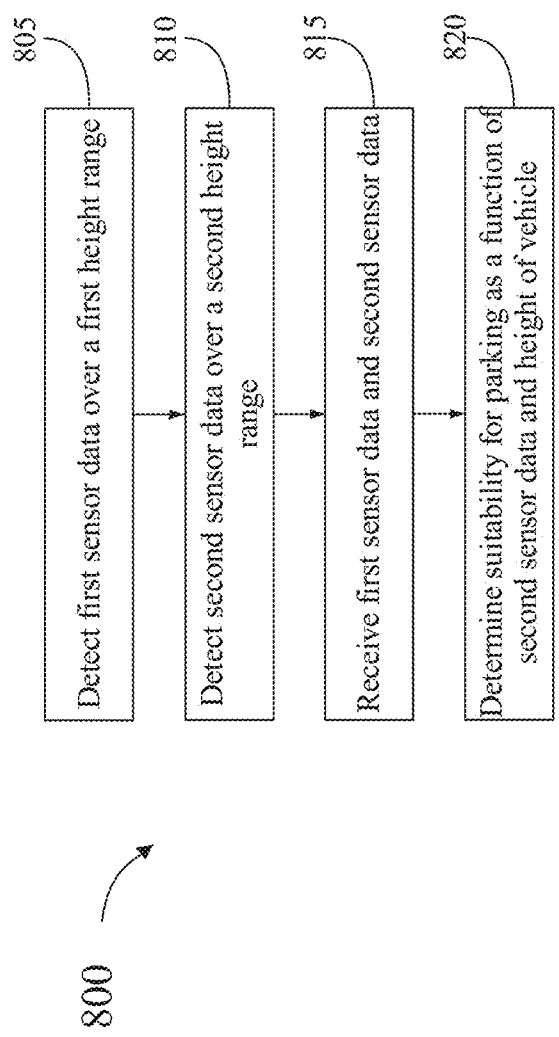
FIG. 8 is a flow diagram illustrating an exemplary method of parking a vehicle.

Referring now to FIG. 8, an exemplary method 800 of parking a vehicle is illustrated by way of a flow diagram. Vehicle may include any vehicle described in this disclosure, for example with reference to FIGS. 1-7. In some embodiments, vehicle may include a recreational vehicle. At step 805, method includes detecting, using a first plurality of sensors located on vehicle, first sensor data as a function of objects within a space proximal the vehicle over a first height range. First plurality of sensors may include any sensors described in this disclosure, for example with reference to FIGS. 1-7. First height range may include any height range described in this disclosure, for example with reference to FIGS. 1-7.

With continued reference to FIG. 8, at step 810, method 800 may include detecting, using a second plurality of sensors located on vehicle, second sensor data as a function of objects within a space proximal the vehicle over a second height range at least partially greater than first height range. Second plurality of sensors may include any sensor described in this disclosure, for example with reference to FIGS. 1-7. Second height range may include any height range described in this disclosure, for example with reference to FIGS. 1-7. In some embodiments, second plurality of sensors may include a proximity sensor. Proximity sensor may include any proximity sensor described in this disclosure, for example with reference to FIGS. 1-7.

With continued reference to FIG. 8, at step 815, method 800 may include receiving, using a computing device, first sensor data from first plurality of sensors and second sensor data from second plurality of sensors. Computing device may include any computing device described in this disclosure, for example with reference to FIGS. 1-7 and 9. First sensor data may include any sensor data described in this disclosure, for example with reference to FIGS. 1-7. Second sensor data may include any sensor data described in this disclosure, for example with reference to FIGS. 1-7.

With continued reference to FIG. 8, at step 820, method 800 may include determining, using computing device, space proximal vehicle is suitable for parking the vehicle as a function of first sensor data, second sensor data, and a height of the vehicle. In some cases, height of vehicle may be within second height range. Height of vehicle may include any height of vehicle described in this disclosure, for example with reference to FIGS. 1-7.

Still referring to FIG. 8, in some embodiments, method 800 may additionally include sensing, using at least a camera located on vehicle, image data as a function of at least a portion of space proximal the vehicle, receiving, using the computing device, the image data from the at least a camera; and determining, using the computing device, the space proximal the vehicle is suitable for parking the vehicle as a function of the image data, first sensor data, second sensor data, and height of the vehicle. Camera may include any camera described in this disclosure, for example with reference to FIGS. 1-7 and 9. Image data may include any image data described in this disclosure, for example with reference to FIGS. 1-7. In some embodiments, at least a camera may include a stereo-camera. Stereo-camera may include any stereo-camera described in this disclosure, for example with reference to FIGS. 1-7.

Still referring to FIG. 8, in some embodiments method 800 may additionally include detecting, using a third plurality of sensors located at a front of vehicle, third sensor data as a function of objects. In some cases, objects may be located over a third height range. Third height range may be at least partially over lapping with second height range. Third plurality of sensors may include any sensor described in this disclosure, for example with reference to FIGS. 1-7. Third height range may include any height range described in this disclosure, for example with reference to FIGS. 1-7.

Still referring to FIG. 8, in some embodiments, method 800 may additionally include automatically parking, using an automatic valet system, vehicle in a space as a function of suitability. Automatic valet system may include any automatic valet system described in this disclosure, for example with reference to FIGS. 1-7.

Still referring to FIG. 8, in some embodiments, method 800 may additionally include alerting, using a user interface, a driver of vehicle as a function of suitability. User interface may include any user interface described in this disclosure, for example with reference to FIGS. 1-7.

Still referring to FIG. 8, in some embodiments, method 800 may additionally include communicating, using computing device, map data over at least a network. Map data may include any map data described in this disclosure, for example with reference to FIGS. 1-7. Network may include any network described in this disclosure, for example with reference to FIGS. 1-7 and 9. In some cases, method 800 may additionally include generating, using computing device, map data as a function of sensor data.

Elements of the present disclosure may be further understood with reference to exemplary parameters and ranges within the table below. Ranges below are provided for exemplary purposes and are not intended to be limiting. In some cases, ranges may be theoretically limitless, and range boundaries provided below may represent practical limits for some exemplary embodiments.

|  | Min. | Nom. | Max. |
| --- | --- | --- | --- |
| First height range* (m) | 0.5-1.5 | 0-2 | 0-3 |
| Second height range* (m) | 1.5-3 | 1-3.5 | 1-5 |
| Third height range* (m) | 0.001 | 1 | >1,000 |
| Vehicle height* (m) | 1.5 | 2.5 | 5 |
| Exemplary Sensors | a global position sensor (GPS), a computer vision system, for example with pose estimation based upon feature tracking of objects, stereoscopic vision, radio-based locating sensors, for example RAdio Detection And Ranging (RADAR) and Ultra-Wideband, light-based locating sensors, for example Light Detection And Ranging (LiDAR), sound-based locating sensors, for example sound navigation and ranging (Sonar), ultrasound-based locating sensors, radio frequency identification (RFIS) sensors, Bluetooth, infrared-based locating sensors, cellular-based locating sensors, wireless local area network (WLAN) based sensors, laser-based locating sensors, and the like. | | |

*Heights and height ranges may be vehicle dependent

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
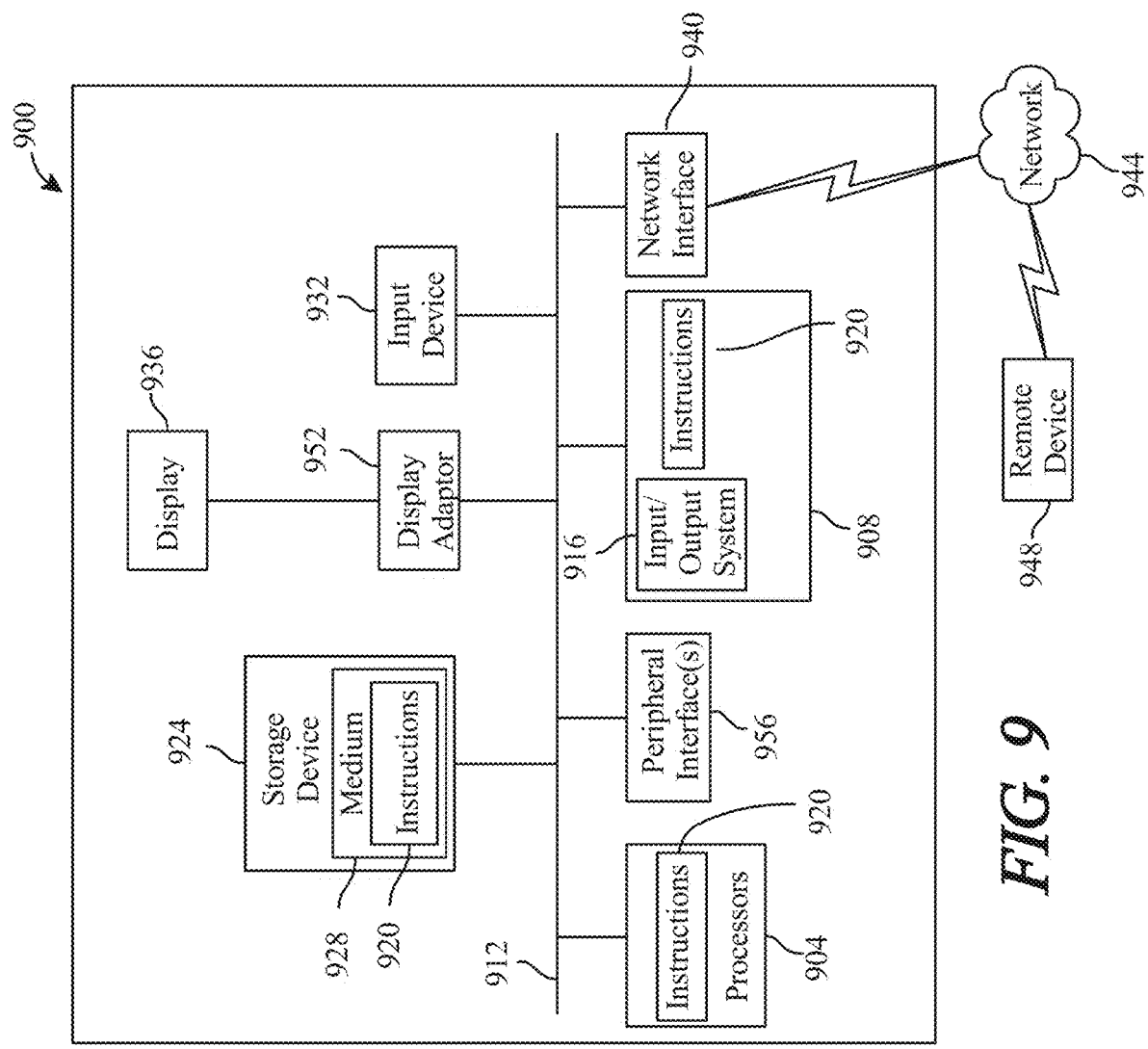
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for parking a vehicle, the system comprising:
   a recreational vehicle, wherein the recreational vehicle includes a living quarters;
   a first plurality of sensors located on the recreational vehicle and configured to detect first sensor data as a function of a first set of objects over a working distance and a first height range wherein the first height range is a function of a location of the first plurality of sensors and a height of a top and a bottom of a first field of view of the first plurality of sensors;
   a second plurality of sensors located on the recreational vehicle and configured to detect second sensor data as a function of a second set of objects over the working distance and a second height range, wherein the second height range is a function of location of the second plurality of sensors and a height of a top and a bottom of a second field of view of the second plurality of sensors, wherein:
   the second height range is at least partially greater than the first height range; and
   at least an object of the second set of objects is above the height of the vehicle within the second height range and includes tree branches; and
   a computing device comprising a processor and configured to:
   receive the first sensor data from the first plurality of sensors and the second sensor data from the second plurality of sensors;
   determine a suitability of the room for the recreational vehicle to park, wherein the room for the recreational vehicle to park is a space proximal to the recreational vehicle, for parking the recreational vehicle as a function of the first sensor data, the second sensor data, and a height of the recreational vehicle, wherein the height of the recreational vehicle is within the second height range;
   record at least one survey datum based on the first sensor data and second sensor data wherein the at least one survey datum comprises at least one data type from surveying at least a point of interest;
   aggregate the at least one survey datum into a survey data structure for generating a parking map.

2. The system of claim 1, wherein the computing device is further configured to park, using an automatic valet system, the recreational vehicle in the room for the recreational vehicle to park as a function of the suitability of the room for the recreational vehicle to park.

3. The system of claim 1, wherein the working distance is 2 meters and the second height range is a range from 1 to 5 meters.

4. The system of claim 2, wherein a height of the recreational vehicle is between 2.5 to 3.5 meters.

5. The system of claim 3, wherein a height of the recreational vehicle is between 2.5 to 5 meters.

6. The system of claim 1, wherein the second plurality of sensors are configured to detect a third set of objects within a working distance at a rear of the recreational vehicle, wherein detecting a third set of objects within the working distance at the rear of the recreational vehicle comprises detecting objects within 2 meters of a rear of the recreational vehicle.

7. The system of claim 1, wherein the first plurality of sensors is configured to detect a third set of objects within the working distance at the rear of the recreational vehicle.

8. The system of claim 1, wherein the system further comprises a third plurality of sensors, wherein the third plurality of sensors are configured to detect a fourth set of objects within a working distance at a front of the recreational vehicle.

9. The system of claim 8, wherein detecting a fourth set of objects within the working distance at the front of the recreational vehicle comprises detecting objects within 2 meters of the front of the recreational vehicle.

10. The system of claim 6, further comprising a camera, wherein the camera is located at a rear of the recreational vehicle and configured to detect a third set of objects within the rear of the recreational vehicle.

11. A method of parking a vehicle, the method comprising:
    detecting, using a first plurality of sensors located on a recreational vehicle, first sensor data as a function of a first set of objects over a working distance and a first height range wherein the first height range is a function of a location of the first plurality of sensors and a height of a top and a bottom of a first field of view of the first plurality of sensors, wherein the recreational vehicle includes a living quarters;

detecting, using a second plurality of sensors located on the recreational vehicle, second sensor data as a function of a second set of objects over a working distance and a second height range wherein the second height range is a function of location of the second plurality of sensors and a height of a top and a bottom of a second field of view of the second plurality of sensors, wherein:

the second height range is at least partially greater than the first height range; and at least an object of the second set of objects is above the height of the vehicle within the second height range;

recording, using a computing device, at least one survey datum wherein the at least one survey datum comprises at least a point of interest;

aggregating, using the computing device, a survey data structure as a function of the at least one survey datum wherein the survey data structure comprises a plurality of data-types resulting from surveying a room for the recreational vehicle to park wherein the plurality of data-types comprises at least a surveyor identifier; and receiving, using the computing device, the first sensor data from the first plurality of sensors and the second sensor data from the second plurality of sensors; and determining, using the computing device, a suitability of a room for the recreational vehicle to park, wherein the room for the recreational vehicle to park is a space proximal to the recreational vehicle, for parking the recreational vehicle as a function of the first sensor data, the second sensor data, and a height of the recreational vehicle, wherein the height of the recreational vehicle is within the second height range.

12. The method of claim 11, further comprising parking, using an automatic valet system, the recreational vehicle in the room for the recreational vehicle to park as a function of the suitability of the room for the recreational vehicle to park.

13. The method of claim 11, wherein the working distance is 2 meters and the second height range is a range from 1 to 5 meters.

14. The method of claim 12, wherein a height of the recreational vehicle is between 2.5 to 3.5 meters.

15. The method of claim 13, wherein a height of the recreational vehicle is between 2.5 to 5 meters.

16. The method of claim 11, further comprising detecting, by the second plurality of sensors, a third set of objects within a working distance at a rear of the recreational vehicle, wherein detecting a third set of objects within the working distance at the rear of the recreational vehicle comprises detecting objects within 2 meters of a rear of the recreational vehicle.

17. The method of claim 11, further comprising detecting, by the first plurality of sensors, a third set of objects within the working distance at the rear of the recreational vehicle.

18. The method of claim 11, further comprising detecting, by a third plurality of sensors, a fourth set of objects within a working distance at a front of the recreational vehicle.

19. The method of claim 18, wherein detecting a fourth set of objects within the working distance at the front of the recreational vehicle comprises detecting objects within 2 meters of the front of the recreational vehicle.

20. The method of claim 16, further comprising detecting, using a camera located at the rear of the recreational vehicle, a third set of objects within the working distance at the rear of the recreational vehicle.

* * * * *